(12) United States Patent
Locker et al.

(10) Patent No.: US 8,086,873 B2
(45) Date of Patent: Dec. 27, 2011

(54) METHOD FOR CONTROLLING FILE ACCESS ON COMPUTER SYSTEMS

(75) Inventors: Howard J. Locker, Cary, NC (US);
Daryl C. Cromer, Cary, NC (US);
Randall S. Springfield, Chapel Hill, NC (US); Rod D. Waltermann, Rougemont, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1524 days.

(21) Appl. No.: 11/446,737

(22) Filed: Jun. 5, 2006

(65) Prior Publication Data

US 2007/0283169 A1 Dec. 6, 2007

(51) Int. Cl.
*G06F 12/14* (2006.01)

(52) U.S. Cl. ........ 713/193; 713/165; 713/167; 713/187; 713/188; 713/189; 726/2; 718/1; 380/26; 711/6

(58) Field of Classification Search .................. 713/1, 2, 713/194, 165, 167, 187–189, 193; 380/200, 380/201, 255, 277, 26; 726/2; 711/6; 718/1
See application file for complete search history.

(56) References Cited

U.S. PATENT DOCUMENTS

| | | | |
|---|---|---|---|
| 5,757,916 A | 5/1998 | MacDoran et al. | |
| 5,757,924 A | 5/1998 | Friedman et al. | |
| 6,138,237 A | 10/2000 | Ruben et al. | |
| 6,223,286 B1 | 4/2001 | Hashimoto | |
| 6,381,737 B1 * | 4/2002 | Click et al. | 717/136 |
| 6,671,377 B1 | 12/2003 | Havinis et al. | |
| 6,683,954 B1 | 1/2004 | Searle | |
| 6,917,923 B1 | 7/2005 | Dimenstein | |
| 6,922,774 B2 * | 7/2005 | Meushaw et al. | 713/151 |
| 6,931,131 B1 | 8/2005 | Becker, Jr. et al. | |
| 7,158,800 B2 * | 1/2007 | Stephens et al. | 455/461 |
| 7,162,647 B2 * | 1/2007 | Osaki | 713/193 |
| 7,260,820 B1 * | 8/2007 | Waldspurger et al. | 718/1 |
| 7,421,533 B2 * | 9/2008 | Zimmer et al. | 711/6 |
| 7,512,810 B1 * | 3/2009 | Ryan | 713/189 |
| 7,526,625 B2 * | 4/2009 | Ebara et al. | 711/163 |
| 7,587,765 B2 * | 9/2009 | Challener et al. | 726/24 |
| 2002/0010869 A1 | 1/2002 | Kim | |
| 2002/0055942 A1 * | 5/2002 | Reynolds | 707/200 |
| 2002/0136407 A1 | 9/2002 | Denning et al. | |
| 2002/0154777 A1 | 10/2002 | Candelore | |
| 2003/0108202 A1 | 6/2003 | Clapper | |
| 2003/0159029 A1 * | 8/2003 | Brown et al. | 713/151 |
| 2003/0165241 A1 | 9/2003 | Fransdonk | |
| 2003/0217151 A1 | 11/2003 | Roese et al. | |

(Continued)

*Primary Examiner* — Saleh Najjar
*Assistant Examiner* — Joseph Pan
(74) *Attorney, Agent, or Firm* — Antony P. Ng; Yudell Isidore Ng Russell PLLC

(57) ABSTRACT

A method for controlling file access on computer systems is disclosed. Initially, a virtual machine manager (VMM) is provided in a computer system. In response to a write request, the VMM determines whether or not a location field is valid. If the location field is not valid, then the VMM writes the write request information to a storage device; but if the location field is valid, then the VMM encrypts the write request information before writing the write request information to the storage device. In response to a read request, the VMM again determines whether or not a location field is valid. If the location field is not valid, then the VMM sends the read request information to a read requester; but, if the location field is valid, then the VMM decrypts the read request information before sending the read request information to the read requester.

15 Claims, 2 Drawing Sheets

U.S. PATENT DOCUMENTS

| | | |
|---|---|---|
| 2004/0057579 A1 | 3/2004 | Fahrny |
| 2004/0179684 A1 | 9/2004 | Appenzeller et al. |
| 2004/0190715 A1 | 9/2004 | Nimura et al. |
| 2004/0205315 A1 | 10/2004 | Ripley et al. |
| 2004/0218207 A1* | 11/2004 | Biundo et al. ............... 358/1.15 |
| 2005/0063542 A1 | 3/2005 | Ryu |
| 2005/0102498 A1* | 5/2005 | Bojinov et al. ............... 713/151 |
| 2005/0108507 A1* | 5/2005 | Chheda et al. ................ 712/209 |
| 2005/0138148 A1 | 6/2005 | Ronen et al. |
| 2005/0138389 A1 | 6/2005 | Catherman et al. |
| 2005/0188171 A1 | 8/2005 | McIntosh |
| 2006/0070066 A1* | 3/2006 | Grobman ......................... 718/1 |
| 2006/0236127 A1* | 10/2006 | Kurien et al. ................. 713/193 |
| 2007/0112999 A1* | 5/2007 | Oney et al. ........................ 711/6 |
| 2007/0136603 A1* | 6/2007 | Kuecuekyan ................. 713/185 |
| 2007/0174897 A1* | 7/2007 | Rothman et al. ................... 726/2 |
| 2007/0192620 A1* | 8/2007 | Challener et al. ............. 713/188 |
| 2007/0226711 A1* | 9/2007 | Challener et al. ............. 717/141 |

* cited by examiner

METHOD FOR CONTROLLING FILE ACCESS ON COMPUTER SYSTEMS

BACKGROUND OF THE INVENTION

1. Technical Field

The present invention relates to data processing systems in general, and, in particular, to a method for providing file security management in data processing systems. Still more particularly, the present invention relates to a method for controlling file access on computer systems.

2. Description of Related Art

With the proliferation of computer systems, electronic documents can be transported and be viewed at practically any place in which a computer system may be found. However, some organizations would want to place a certain restriction on access to some of their files. For example, a company may allow electronic documents to be freely viewed within the company areas but not outside the company areas. Although a policy can be put in place to prohibit company electronic documents from being carried outside the company areas by company employees, some company electronic documents may still be transported outside the company areas, inadvertently or otherwise. As more and more electronic documents are being produced, the percentage of company electronic documents that are "sneaked" outside the company areas is expected to increase.

In addition, today's computer systems are typically equipped with various peripheral devices designed to allow electronic files to be easily transported from one computer system to another. Those peripheral devices includes floppy disk drives, compact disc drives, etc. Electronic files can also be easily transported from one computer system to another via portable storage devices such as universal serial bus (USB) drives—commonly known as thumb drives. Such peripheral and storage devices can pose a security problem for electronic files that are restricted to limited access. Although there are solutions for restricting file access which can prevent write operations to the above-mentioned devices, such solutions also limit the functionalities of computer systems.

Consequently, it would be desirable to provide an improved method for controlling file access on computer systems.

SUMMARY OF THE INVENTION

In accordance with a preferred embodiment of the present invention, a virtual machine manager is provided in a computer system. The virtual machine manager selectively encrypts files using different public keys depending on the location of the computer system. Locations at which the computer system are authorized can be stored in a respective location field of a location table that can be accessed by the virtual machine manager.

In response to a write request, the virtual machine manager determines whether or not a location field is valid. If the location field is determined to be not valid, then the virtual machine manager writes the write request information to a storage device. Otherwise, if the location field is determined to be valid, then the virtual machine manager encrypts the write request information with a public/private key associated with the location field before writing the write request information to the storage device.

In response to a read request, the virtual machine manager again determines whether or not a location field is valid. If the location field is determined to be not valid, then the virtual machine manager sends the read request information to a read requestor. Otherwise, if the location field is determined to be valid, then the virtual machine manager decrypts the read request information with a public/private key associated with the location field before sending the read request information to the read requestor.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
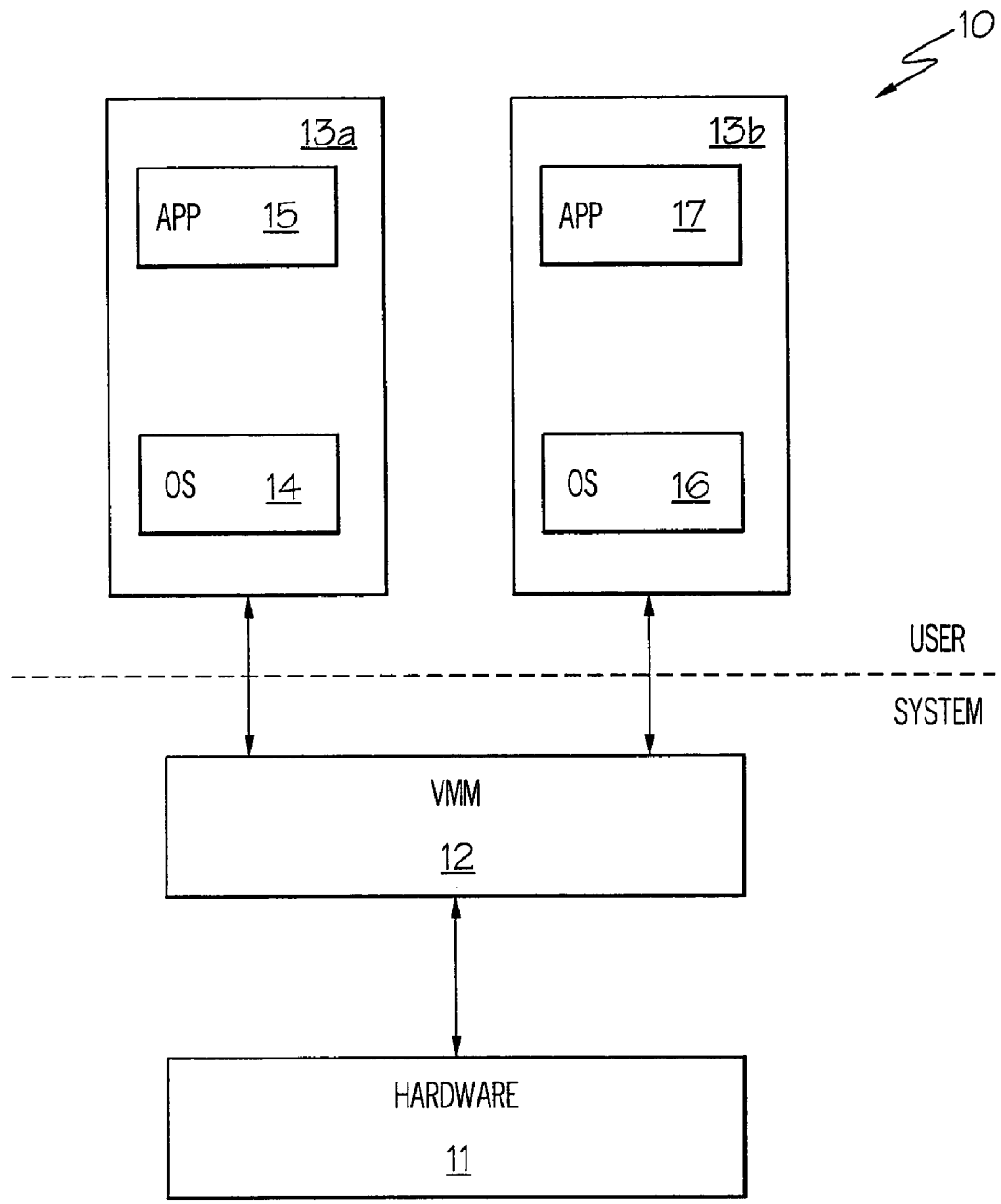
FIG. 1 is a block diagram of a computing system in which a preferred embodiment of the present invention is incorporated.

Referring now to the drawings and in particular to FIG. 1, there is depicted a block diagram of a computing environment in which a preferred embodiment of the present invention is incorporated. As shown, a computer system 10 includes a hardware structure 11, a virtual machine manager (VMM) or hypervisor 12 and virtual machines 13a-13b. Virtual machines 13a and 13b are preferably located in separate partitions such that any execution within virtual machine 13a is isolated from virtual machine 13b, or vice versa. VMM 12 controls all communications between virtual machines 13a and 13b. In addition, VMM 12 can directly communicate with hardware structure 11. Hardware structure 11 includes such known structures as processors, registers, memory management units, memory devices, input/output devices, etc.

An operating system and multiple application programs can be executed concurrently within each of virtual machines 13a-13b. For example, an operating system 14 and an application program 15 are executed within virtual machine 13a, while an operating system 16 and an application program 17 are executed within virtual machine 13b.

Although it is not required, operating system 14 can be different from operating system 16. For example, operating system 14 can be an open source Linux operating system, while operating system 15 can be Windows® operating system manufactured by the Microsoft Corporation. Similarly, the underlying processor emulated by virtual machine 13a can also be different from the underlying processor emulated by virtual machine 13b. For example, the underlying processor emulated by virtual machine 13a can be a Pentium® processor manufactured by the Intel Corporation, while the underlying processor emulated by virtual machine 13b can be a PowerPC® processor manufactured by the International Business Machines Corporation.

Each of virtual machines 13a-13b, which includes its operating system and associated application programs, operates at a user-level. When VMM 12 uses direct execution, VMM 12 is set to a so-called user-mode (i.e., with reduced privileges) so that none of virtual machines 13a-13b can directly access the various privileged registers that control the operation of hardware structure 11. Rather, all privileged instructions will be trapped into VMM 12.

In accordance with a preferred embodiment of the present invention, files are selectively encrypted before they are written on a non-portable storage device, such as a hard drive, of a computer system using a VMM such as VMM 12. Encryptions are preferably performed via public/private key infrastructure that is well-known to those skilled in the art. An unique public/private key is preferably associated with a separate location in which a computer system is placed, but one public/private key can also be associated with multiple locations in which the computer system may be placed.

Location information, such as locations in which a computer system may be placed, are preferably stored in a location table within the computer system. The location table may include, for example, multiple location fields, each for storing a location in which the computer system may be placed. Access to the location table is limited to authorized personnel only. Public/private keys associated with location information can be securely stored locally within a computer system and/or remotely in a server system.

On a read request, the VMM will attempt to decrypt the read request data from a file using the public/private key associated with the location in which a computer is placed. If the read request is not made at the same location in which the read request data was stored, then the read request data will be sent to the read requestor without any decryption, and thus, the read request data cannot be understood by the read requester. For example, company files are encrypted before they are written onto a hard drive within a computer system located within the company area. Even if one or more of the company files are taken back home by a company employee via a portable storage device, those company files cannot be read via a home computer system of the company employee (or even the company computer system) because the company files will not be decrypted by the VMM of the home computer system or the company computer system due to the location change.

Since the VMM is performing all encryptions and decryptions, the operating system performs read and write operations as usual based on the request without knowing the encryptions and decryptions. The VMM can use any one or more of the following methods to determine the physical location at which a computer system is placed:
  i. network subnet;
  ii. wireless access point connection name or SSID;
  iii. global positioning system (GPS).
The above-mentioned methods are some of the easier methods for determining the physical location of a computer system, and it is understood by those skilled in the art that there are many other alternative methods for determining the physical location of a computer system. Once the VMM knows the location of a computer system, the VMM can provide the proper public/private key from a location table for performing encryption. This ensures that a read operation on a computer system can only occur in the same location as a write operation.

Figure 2:
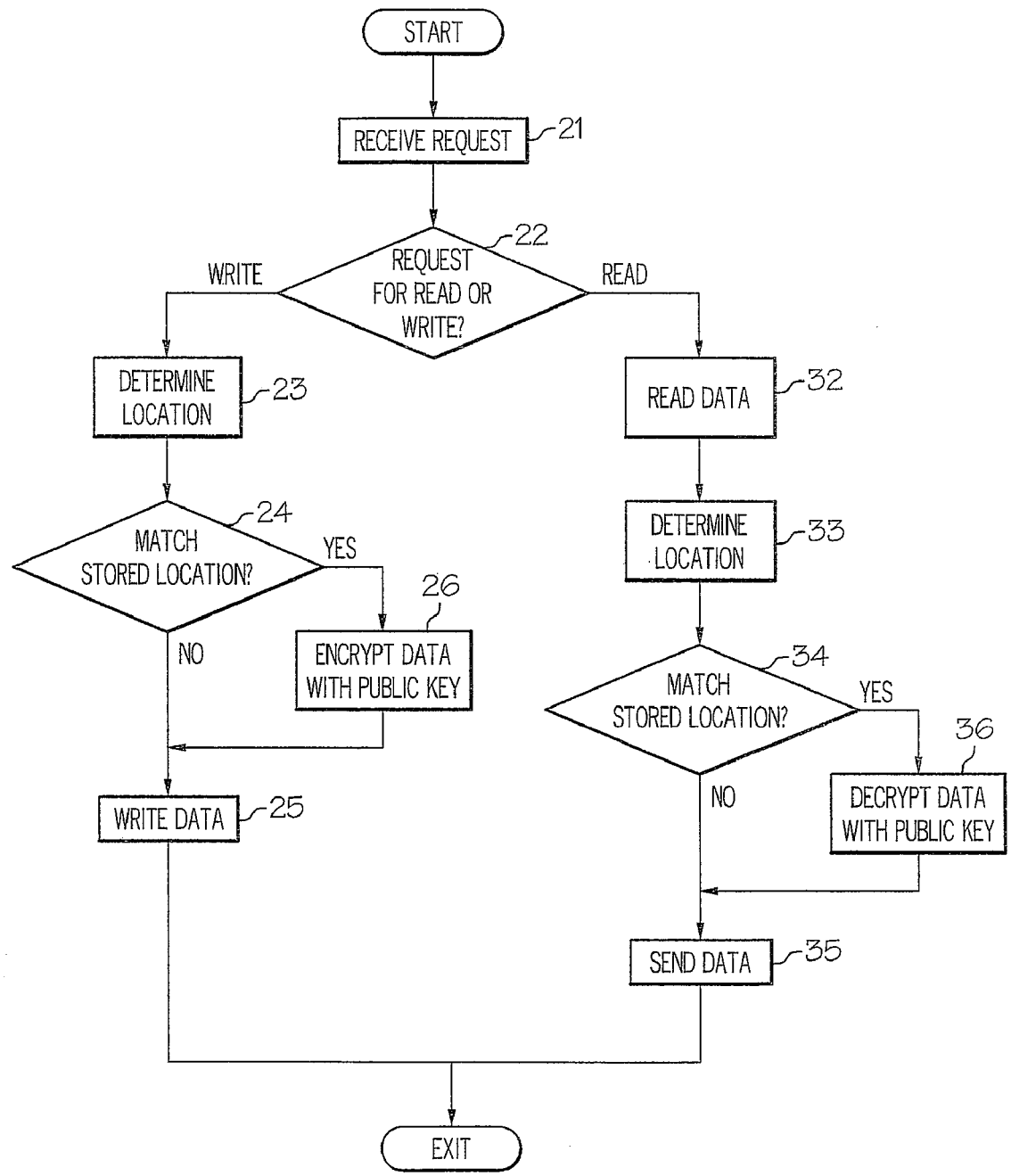
FIG. 2 is a high-level logic flow diagram of a method for controlling file access on the computing system from FIG. 1, in accordance with a preferred embodiment of the present invention.

With reference now to FIG. 2, there is depicted a high-level logic flow diagram of a method for controlling file access on computer system 10, in accordance with a preferred embodiment of the present invention. After the receipt of a request, as shown in block 21, a determination is made by VMM 12 as to whether or not the request is a read request or a write request, as depicted in block 22. If the request is a write request, the current location of computer system 10 is obtained, as shown in block 23. A determination is then made as to whether or not the current location of computer system 10 matches the location information previously stored in a location table, as depicted in block 24. If the current location does not match the location information previously stored in the location table, the write request data are directly written to a storage device, such as a hard drive, within computer system 10, as shown in block 25. However, if the current location matches the location information previously stored in the location table, a public key associated with the current location is obtained, and the write request data are encrypted using the public key, as depicted in block 26, before the write request data are written to the storage device, as shown in block 25.

If the request is a read request, the read request data is read from the storage device, as depicted in block 32. Then, the current location of computer system 10 is obtained, as shown in block 33. A determination is then made as to whether or not the current location of computer system 10 matches the location information previously stored in the location table, as depicted in block 34. If the current location does not match the location information previously stored in the location table, the read request data are directly sent to the read requestor, as shown in block 35. Since the data were previously encrypted; thus, the read requestor would not able to use the data.

However, if the current location matches the location information previously stored in the location table, a public key associated with the current location is obtained, and the read request data are decrypted with the public key, as depicted in block 36, before the read request data are sent to the read requester, as shown in block 35. The decrypted data can now be utilized by the read requestor.

As has been described, the present invention provides an improved method and apparatus for controlling file access on computer systems, depending on their location. The advantage of the present invention is that critical data on a computer system are protected from unauthorized usages while removable and portable read/write devices within the computer system can still be used.

It is also important to note that although the present invention has been described in the context of a fully functional computer system, those skilled in the art will appreciate that the mechanisms of the present invention are capable of being distributed as a program product in a variety of.

While the invention has been particularly shown and described with reference to a preferred embodiment, it will be understood by those skilled in the art that various changes in form and detail may be made therein without departing from the spirit and scope of the invention.

What is claimed is:

1. A method comprising:
  providing a location table having a plurality of location fields;
  providing a virtual machine manager (VMM) in a computer system, wherein said VMM interfaces between an operating system of said computer system and hardware of said computer system;
  in response to a write request,
    determining whether or not a location field of said location table is valid by said VMM;
    writing write request information to a storage device by said VMM if said location field is not valid; and
    encrypting said write request information with a public key associated with said location field by said VMM before writing said write request information to said storage device if said location field is valid; and
  in response to a read request,
    determining whether or not said location field is valid by said VMM;

sending read request information from said storage device by said VMM if said location field is not valid; and decrypting information with a public key associated with said location field by said VMM before sending said read request information device if said location field is valid.

2. The method of claim 1, wherein said method further includes storing in one of said location files a location in which said computer system is authorized to be placed.

3. The method of claim 2, wherein said location field is valid when the current location of said computer system matches one of said location fields.

4. The method of claim 2, wherein said method further includes associating one of said location fields to one public/private key.

5. The method of claim 2, wherein said method further includes associating a plurality of said location fields to one public/private key.

6. A non-transitory computer usable medium having a computer program product for controlling file access on computer systems, said computer usable medium comprising:

program code for providing a location table having a plurality of location fields;

program code for providing a virtual machine manager (VMM) in a computer system, wherein said VMM interfaces between an operating system of said computer system and hardware of said computer system;

in response to a write request, program code for determining whether or not a location field of said location table is valid by said VMM;

program code for writing write request information to a storage device by said VMM if said location field is not valid; and program code for encrypting said write request information with a public key associated with said location field by said VMM before writing said write request information to said storage device if said location field is valid; and in response to a read request, program code for determining whether or not said location field is valid by said VMM;

program code for sending read request information from said storage device by said VMM if said location field is not valid; and program code for decrypting information with a public key associated with said location field by said VMM before sending said read request information device if said location field is valid.

7. The non-transitory computer usable medium of claim 6, wherein said computer usable medium further includes program code for storing in one of said location files a location in which said computer system is authorized to be placed.

8. The non-transitory computer usable medium of claim 7, wherein said location field is valid when the current location of said computer system matches one of said location fields.

9. The non-transitory computer usable medium of claim 7, wherein said computer usable medium further includes program code for associating one of said location fields to one public/private key.

10. The non-transitory computer usable medium of claim 7, wherein said computer usable medium further includes program code for associating a plurality of said location fields to one public/private key.

11. A computer system comprising:

a processor;

a location table having a plurality of location fields;

a first virtual machine having a first application and a first operating system;

a second virtual machine having a second application and a second operating system;

a virtual machine manager (VMM) for interfacing between said virtual machines and said processor, wherein said VMM in response to a write request, determines whether or not a location field of said location table is valid;

sends write request information to a storage device if said location field is not valid; and encrypts said write request information with a public key associated with said location field before writing said write request information to said storage device if said location field is valid; and in response to a read request, determines whether or not a location field is valid;

sends read request information from said storage device if said location field is not valid; and decrypts information with a public key associated with said location field before sending said read request information device if said location field is valid.

12. The computer system of claim 11, wherein said location fields are configured to store locations in which said computer system are authorized to be placed.

13. The computer system of claim 12, wherein said location field is valid when the current location of said computer system matches one of said location fields.

14. The computer system of claim 12, wherein said computer system further includes means for associating one of said location fields to one public/private key.

15. The computer system of claim 12, wherein said computer system further includes means for associating a plurality of said location fields to one public/private key.

* * * * *